United States Patent [19]

Contaldo

[11] 4,132,147
[45] Jan. 2, 1979

[54] STORE RETENTION AND RELEASE MECHANISM

[75] Inventor: Attilio Contaldo, Costa Mesa, Calif.

[73] Assignee: SPS Technologies, Inc., Jenkintown, Pa.

[21] Appl. No.: 828,365

[22] Filed: Aug. 29, 1977

[51] Int. Cl.² .............................................. F41F 5/02
[52] U.S. Cl. .............................. 89/1.5 G; 244/137 R; 294/86.25; 294/96; 403/14; 403/317; 403/290
[58] Field of Search ................ 89/1.5 R, 1.5 F, 1.5 G, 89/1.5 B; 244/137 R; 294/83 R, 83 AA, 83 AB, 83 AE, 86.24, 86.25, 94, 96; 403/316, 317, 13, 14, 290

[56] References Cited

U.S. PATENT DOCUMENTS

| 2,499,712 | 3/1950 | Armstrong | 89/1.5 G X |
| 3,010,752 | 11/1961 | Geffner | 244/137 R X |
| 3,121,583 | 2/1964 | Damm | 89/1.5 R X |
| 3,181,908 | 5/1965 | Clark | 294/86.25 X |
| 3,638,988 | 1/1972 | Brown | 294/86.25 X |
| 3,810,671 | 5/1974 | Jeffery | 89/1.5 F X |
| 3,887,150 | 6/1975 | Jakubowski | 244/137 R |

Primary Examiner—David H. Brown
Attorney, Agent, or Firm—Aaron Nerenberg

[57] ABSTRACT

A retention and release mechanism utilizes a collet with deflectable fingers to allow assembly of the mechanism onto an object which is to be retained. Movement of the object toward the mechanism causes a force to be exerted on the bottom end of a plunger and movement of the plunger, which is coupled to a lockpin by a plurality of spherical balls and a split ring, from a released to a retained position. In the retained position, the balls secure the lockpin in a fixed position relative to the collet while mating tapered surfaces at the ends of the collet fingers and the lockpin cooperate to retain the object to which an expendable bushing has been attached, the bushing being part of the mechanism. To release the object, a force must be exerted on the top end of the plunger to move it to an axial position wherein the balls are released from their fixed position relative to the collet and the mating tapered surfaces move away from each other. The weight of the object causes the fingers to deflect inwardly, releasing the object.

16 Claims, 6 Drawing Figures

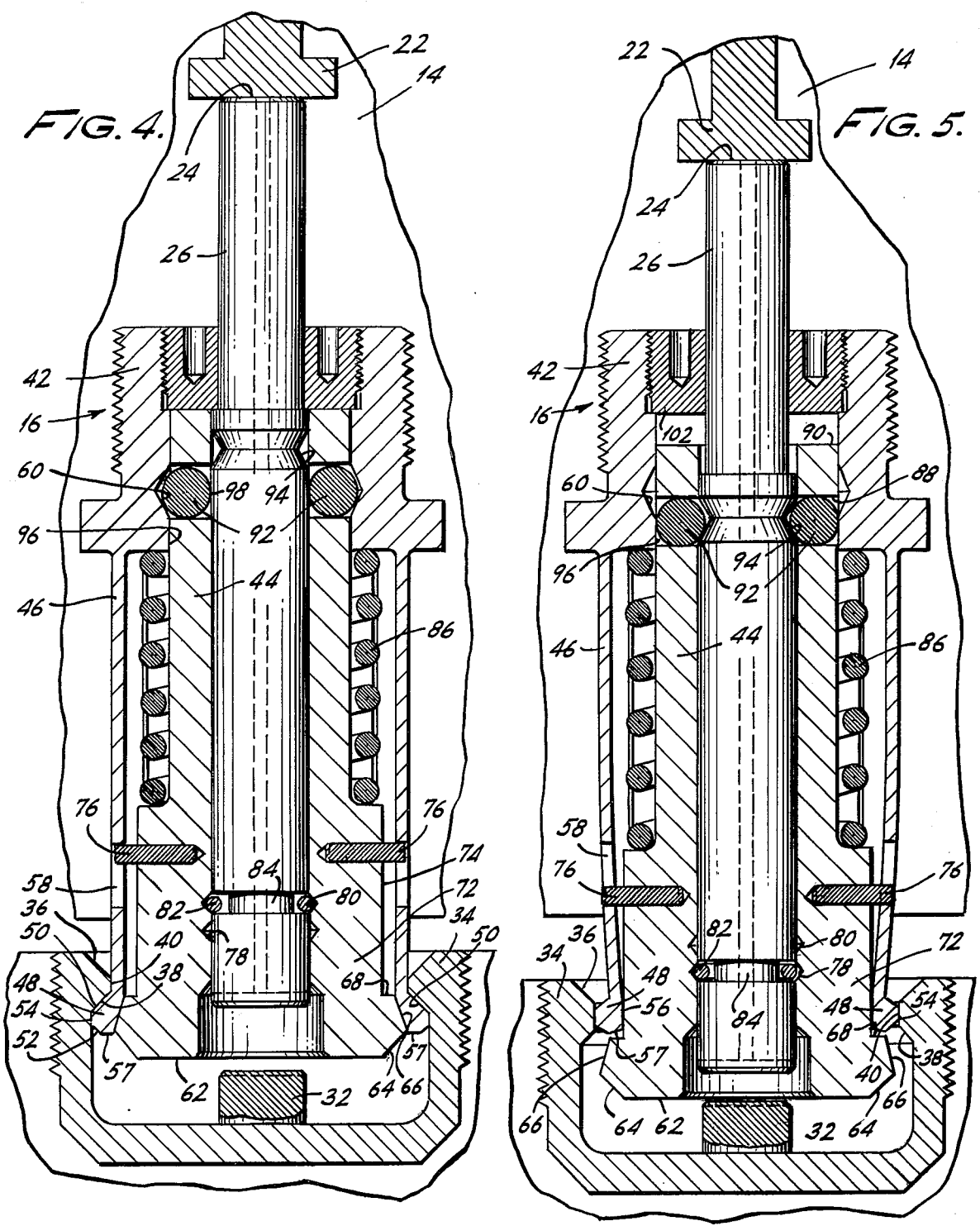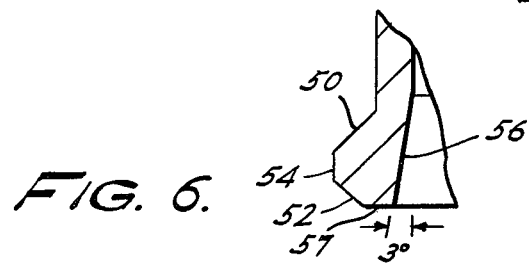

STORE RETENTION AND RELEASE MECHANISM

BACKGROUND OF THE INVENTION

The present invention relates generally to the field of handling and release mechanisms, and more specifically to a positive retention and selectively releasable mechanism utilizing the resilient deflection of elongated members to effect retention and release of aircraft stores.

Present combat aircraft employ a number of different types of weapons such as, for example, missiles, rockets, bombs, etc., which are referred to as stores. In addition, other objects such as auxilliary fuel tanks and mounting racks, to name just a couple, are suspended from the underside of aircraft during flight. A number of devices are currently used to secure these various stores and objects to the aircraft. One type of device which is widely used is a pair of rotatable hooks within the aircraft which selectively engage and release lug rings mounted on the store. Examples of such devices are found in U.S. Pat. Nos. 3,722,944, 3,799,478 and 3,982,466. While this arrangement is relatively simple, the store is free to rock back and forth once it is latched to the aircraft. To overcome this relatively dangerous condition, especially aboard an aircraft carrier that is constantly pitching, yawing and rolling, sway brace assemblies must be employed to restrain movement of the store after it is latched. One example of such an assembly is shown in U.S. Pat. No. 3,967,528. Other release mechanisms, such as the explosively driven mechanism shown in U.S. Pat. No. 3,546,999, could also possibly be used, but each has some disadvantage which makes its use not fully desirable.

It is a further requirement that most stores be forceably ejected away from the envelope of the aircraft during flight so as not to interfere with the aerodynamics, especially at supersonic speeds. To achieve this object, launcher (or ejector) mechanisms are employed which forceably eject the store from the aircraft at the proper attitude, speed, etc.. Examples of such launcher (or ejector) systems can be seen in U.S. Pat. Nos. 3,756,545, 3,799,478, 3,883,097, 3,898,909, 3,936,019 and 4,008,645. It should be understood that the present invention does not include provision for such a launcher (or ejector) mechanism, but is contemplated to be fully compatable with existing mechanisms of various types.

Accordingly, it is a general purpose and object of the present invention to provide a novel positive locking retention and release mechanism which is of relatively low weight, small size and low cost, is simple to operate and substantially reusable. It is a further object to provide such a mechanism for retaining and selectively releasing aircraft stores in a safe and reliable manner. It is still a further object to provide such a mechanism which cannot be accidently actuated to a locked condition by the attempted engagement of a misaligned object, or readily be actuated by tampering.

These and other objects are accomplished according to the present invention by a mechanism for selectively retaining and releasing an object, which mechanism generally includes plunger means, tubular pin means, collet means, wedging means, retaining means, bushing means, biasing means and elastic means. The plunger means includes first and second recess means, the first recess means being adapted to carry the elastic means. The tubular pin means surrounds the plunger means in slideable relationship therewith, and includes recess means on the inside surface thereof which selectively register with the elastic means and the plunger means first recess means. The pin means further includes a bearing surface adjacent a first end thereof, an opening adjacent a second end thereof and a shank portion between the bearing surface and the opening forming a recess with respect to the bearing surface. The collet means surrounds the pin means and includes a deflectable portion with a protuberance adjacent a first end thereof, the protuberance having a first bearing surface formed to cooperate with the pin means bearing surface, and a second bearing surface. The collet means further includes recess means therein spaced from a second end thereof. The wedging means is carried in the pin means opening and is formed to selectively register with the plunger means second recess means and the collet means recess means. The retaining means is operative to slideably retain the pin means to the collet means between a first retained position and a second released position relative to the collet means. The bushing means is formed to be attached to the object and includes driving means for exerting an axial force on a first end of the plunger means, and means for camming the collet means deflectable portion toward the pin means shank portion when initially engaging the object. The bushing means also includes means thereon adapted to cooperate with the second bearing surface on the collet means protuberance to retain the object in the first retained position of the mechanism. In this first retained position, the wedging means registers with the collet means recess means and a surface of the plunger means, the elastic means registers with the pin means recess means to fix the pin means, collet means and plunger means with respect to each other, and the pin means bearing surface contacts the first bearing surface on the collar means protuberance. In the second released position of the mechanism, the means on the bushing means for retaining the object is operative to deflect the collet means deflectable portion toward the pin means shank portion in order to release the object. In this second released position, the plunger means is shifted to a position allowing the wedging means to register with the plunger means second recess means and a surface of the collet means, and causing the pin means bearing surface and the first bearing surface on the collet means protuberance to separate from each other to allow the collet means deflectable portion to deflect.

BRIEF DESCRIPTION OF THE DRAWINGS

FIG. 4 shows the mechanism of FIG. 2 in a finally retained position;

FIG. 5 shows the mechanism of FIG. 2 in a released position; and

FIG. 6 is an enlarged side elevation view in cross-section of the tip of a portion of the collet shown in FIGS. 2-5.

DESCRIPTION OF THE PREFERRED EMBODIMENT

Figure 1:
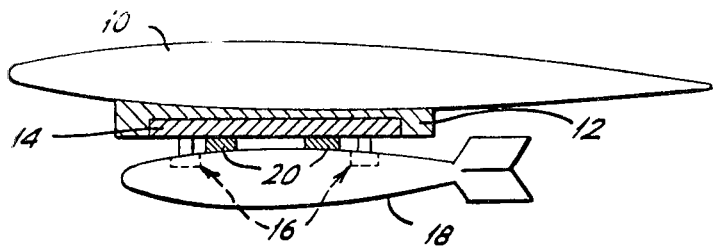
FIG. 1 is a side elevation view partially in cross-section showing a retention and release mechanism in accordance with the present invention in a typical aircraft environment.

In accordance with a preferred embodiment of the present invention, FIG. 1 illustrates a typical aircraft wing 10 with a pylon 12 depending therefrom and a launcher (or ejector) mechanism 14 mounted within the pylon. These components are well known in the aerospace industry and thus they will not be described in greater detail. A portion of two retention and release mechanisms 16 according to the present invention are shown engaging a typical aircraft store 18 such as a missle, rocket, or bomb, to name a few. It should be understood that mechanisms 16 can also be used, for example, to retain auxiliary fuel tanks, mounting racks or other objects which might be suspended from an aircraft during flight and later jettisoned. However, the present invention is not limited to use in an aircraft environment, but could be utilized in any other application where positive retention of an object followed by selective release is necessary. Typically, an aircraft store is suspended at two places for stability and safety, and a pair of wedging members 20 are forced between store 18 and launcher mechanism 14 to prevent lateral motion therebetween.

Referring now to FIGS. 2-5, mechanism 16 will be described in greater detail in several positions during engagement, retention and release of store 18. A portion of launcher mechanism 14 is shown cut away to illustrate its cooperative relationship with retention and release mechanism 16. A piston 22, which is part of launcher mechanism 14, is shown juxtaposed from an end 24 of a plunger 26, which forms a part of mechanism 16. The launcher mechanism 14 is normally employed in a weapons release system to forceably eject the store away from the surface of the aircraft in order to insure that the store will not strike the surface of the aircraft and cause possible damage, and also to impart to the store sufficient force to insure that it assumes a proper attitude for controlled flight, in the case of a rocket or a missile. Devices of this type are described, for example, in U.S. Pat. Nos. 3,756,545, 3,799,478, 3,883,097, 3,898,909, 3,936,019 and 4,008,645.

Figure 2:
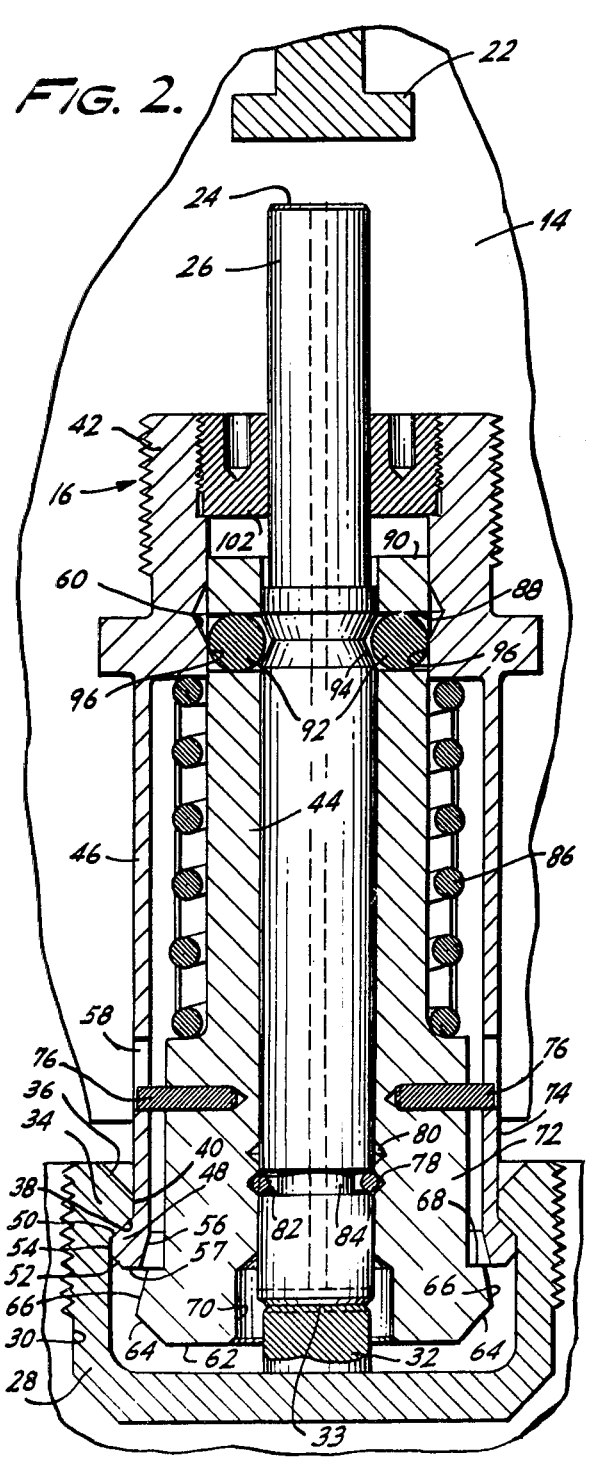
FIG. 2 is an enlarged side elevation view in cross-section of the mechanism of FIG. 1 shown in an initially engaged position.
Figure 3:
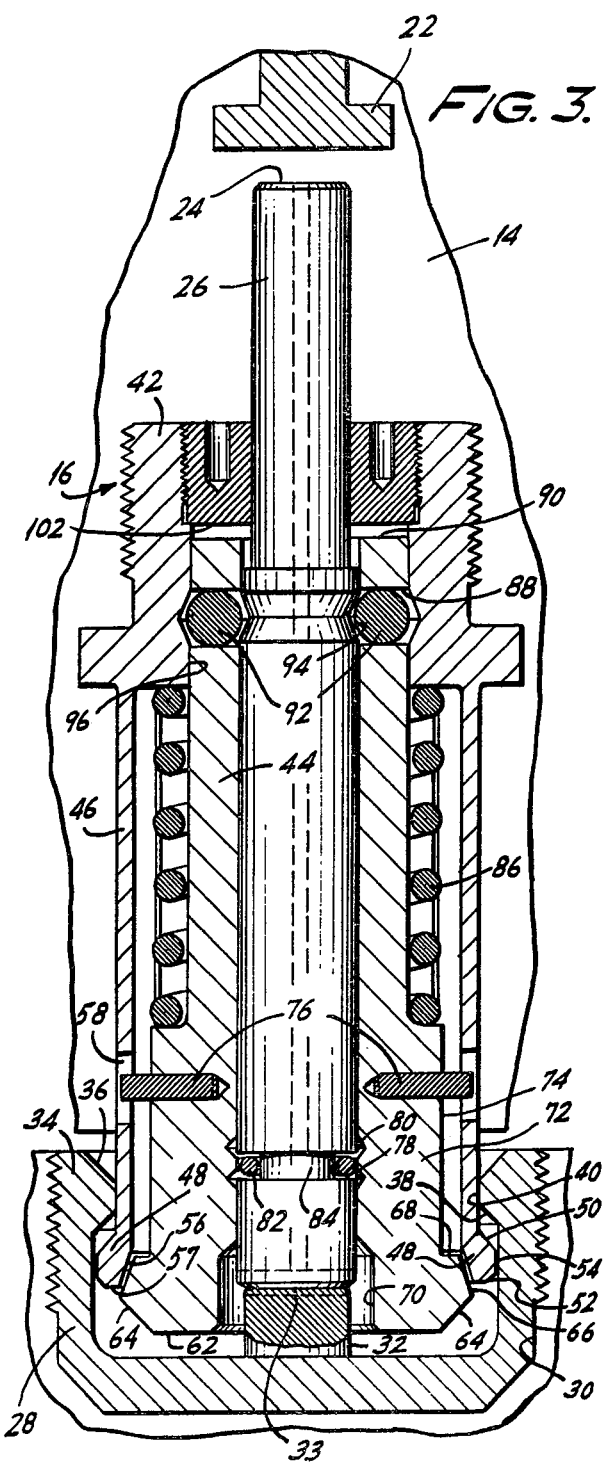
FIG. 3 shows the mechanism of FIG. 2 in an intermediate engaged position.

The present invention requires the addition to any such launcher mechanism, force transmitting piston 22, as shown schematically, whose purpose will be described in greater detail hereinafter. Mechanism 16 is shown in FIG. 2 in an initially engaged position with store 18 shown partially cut away, which has a bushing 28 attached in some convenient manner in an opening 30 in the store (such as by mating threads which are not shown). It is pointed out here that the bushing is a necessary component of the present embodiment because it possesses certain features which will be described in detail with regard to the functional operation of the retention and release mechanism. However, it is possible to incorporate these necessary features in the store or object being retained and thus eliminate the need for bushing 18. The features of bushing 18 which are referred to above are a driving member 32 in the bottom of the bushing, and a protrusion 34 adjacent an end 36 of the bushing. In the present preferred embodiment, protrusion 34 is in the shape of a truncated cone having tapered surfaces 36 and 38, and a generally axially disposed flat surface 40. While this particular shape is described for illustrative purposes, it should be understood that protrusion 34 could assume any of a number of other shapes such as, for example, round, triangular, elliptical, etc. while still remaining within the scope of the present invention.

Mechanism 16 also includes a tubular collet member 42 which surrounds a tubular pin member 44 surrounding plunger 26. Collet member 42 is attached at one end in some convenient manner, such as by threading, to launcher mechanism 14 and includes a plurality of axial slots (not shown), each extending from the free end of the collet to a point spaced from the attached end, thus providing a plurality of deflectable fingers 46. Each of fingers 46 have a protuberance 48 adjacent their respective free ends, which in the preferred embodiment includes tapered surfaces 50 and 52 separated by an axially disposed surface 54 on the outside of the protuberance, and tapered surface 56 on the inside of the protuberance separated from tapered surface 52 by a generally radially disposed surface 57. It should be understood that while the shape of the protuberance has been described in the above manner, it could assume a number of different shapes as described with respect to protrusion 34 on bushing 28, the important requirement being that the mating surfaces of protrusion 34 and protuberance 48 are complementary to each other. It is also pointed out that surface 56, which will be discussed in greater detail hereinafter, could be axially disposed instead of being tapered as shown. Collet 42 further includes slots 58 formed in diametrically opposite fingers 46, whose purpose will be described with regard to the cooperative relationship between pin member 44 and collet 42, and a recess in the form of a groove 60 formed on the inside surface of the non-deflectable portion of the collet. While a continuous, V-shaped groove is shown and described for illustrative purposes, the groove could assume a number of other shapes, and in fact need not be continuous but could be discrete recesses. These alternate possible configurations will become more clear when the function of groove 60 is discussed in detail hereinbelow.

Pin 44 includes a generally radially disposed surface 62 at its exposed end, and tapered surfaces 64 and 66 terminating at a generally radially disposed shoulder 68. Tapered surface 66 is formed at a complementary angle to the angle of tapered surface 56 on collet 42, and consequently, as previously discussed, both of these surfaces may be axially disposed instead of being tapered as shown. However, the complementary tapered configuration offers certain functional advantages which will be discussed later. Pin 44 also includes a counterbore 70 in surface 62 designed to clear driving member 32 on bushing 28 by a generous amount, so that mechanism 16 cannot be inadvertantly locked in a retained position by a misaligned store, or readily locked in the retained position by a person tampering with the mechanism. Actuation to the retained position prior to proper engagement of the store would prevent retention unless the mechanism is released, as will be described. Pin 44 has a shank portion 72 whose surface 74 is recessed from surface 66 to allow deflection of protuberance 48 there-into when it is cammed inwardly by protrusion 34 on bushing 28 during engagement and release of the store. A pair of dowels 76 are carried by shank portion 72 and extend into slots 58 in the collet fingers to restrict movement of pin member 44 between the ends of the slot and retain the pin from falling out of the collet in the released position of the mechanism. By way of further explanation, when the dowel is in the end of slot 58 closet to the free end (surface 57) of the collet, the mechanism is in its released position; and when the dowel is at the other end of slot 58, the mechanism is in its retained position. Pin 44 further includes axially separated recesses or grooves 78 and 80 into which an elastically deflectable split ring 82 is designed to fit. The recesses may be continuous, V-shaped grooves, as shown, or they may assume other shapes. Alternatively, they may be discreet instead of continuous. Their function is to provide a recess into which the ring may expand to its normal at-rest diameter. A cooperating groove 84 is provided in plunger 26 into which the ring contracts during shifting of the mechanism from the released to the retained positions, and vice versa. The function of ring 82 is to retain plunger 26 from falling out of pin 42 when it is engaged in groove 80 in the locked, retained position illustrated in FIG. 4. It also provides a component of force which must be overcome, along with another, greater force to be explained hereinbelow, in order to release the store after it has been retained. While recess or groove 78 has been included in the present preferred embodiment, its function is to allow the ring to expand to its full diameter in the released position, in order that the ring does not remain under stress. This groove, however, serves no retention or other operational function, and consequently is not essential to the operation of the mechanism.

A compression spring 86 is placed between pin 44 and collet 42 in some convenient manner such as shown, in order to provide a continuous bias on the pin toward the released position. The force provided by spring 86 may typically be on the order of 20-30 pounds, and aids in the shifting of the mechanism from the retained to the released position.

Pin 44 includes a plurality of openings 88 through its annular wall near the other end 90, each of which carry wedging devices, such as spherical balls 92. The shape of these wedging devices could be varied while still remaining within the principles of this invention. A recess in the form of a continuous groove 94 is provided in plunger 26, which, like recess 60 in collet 42, is designed to accept a portion of the wedging devices or balls 92. Similarly to recesses 60, recesses 94 may vary in shape and may be discrete instead of continuous. In the released position shown in FIG. 2, balls 92 are resting in groove 94 and against a surface 96 on the inside of collet 42, while in the retained position shown in FIG. 4, balls 92 are resting in groove 60 and against a surface 98 on plunger 26. The significance of these configuration relationships will be discussed in greater detail in conjunction with the description of the operation of the device during shifting from the released to the retained position, and from retained to the released position.

A retainer plug having a bottom surface 102 is inserted at the top of collet 42 in order to provide a stop for the upward travel of pin 42 and plunger 26 in the retained position. The plug is utilized for convenience of assembly of the mechanism, but could be eliminated as a separate element by incorporating it into the top portion of the collet.

Operation of the mechanism will now be described with respect to FIGS. 2-5. Store 18 is initially aligned by manually or mechanically raising the store until tapered surface 36 on protrusion 34 is aligned with complementary tapered surfaces 52 on deflectable fingers 40. Further upward force causes fingers 40 to deflect inwardly allowing protrusion 34 to clear protuberance 48 with tapered surface 38 adjacent surface 50, as illustrated in FIG. 2. This is considered the engaged position with driving member 32 adjacent a free end 33 of plunger 26. It is important to note that mechanism 16 is not in a locked or retained position at this point because plunger 26 has not been shifted to its upwardmost position, as shown in FIG. 4. In the engaged position, split ring 82 is expanded into grooves 78 and 84 which are aligned, and balls 92 are resting in groove 94 and against surface 96 on collet 42. Dowel 76 is resting in the bottom of slot 58. It can be seen that mechanism 16 cannot be inadvertently locked unless driving member 32 is properly aligned with end 33 on plunger 26, and this is not possible unless store 18 is properly aligned with mechanism 16. Further upward movement of store 18 causes driving member 32 to move plunger 26 upwardly against the force of spring 86, causing ring 82 to compress into groove 84 in the plunger. As shown in the intermediate position in FIG. 3, ring 82 is between grooves 78 and 80, dowel 76 is approximately midway between the ends of slot 58, and balls 92 are resting partially in grooves 60 and 94 which are radially aligned. As previously discussed, movement of plunger 26 causes pin 44 carrying balls 92 to move in relationship thereto in an axial direction. Due to the necessary geometry of these two members, plunger 26 typically moves approximately twice the axial distance of pin 44. Actual values might typically be ¼ inch of movement for plunger 26 and ⅛ inch of movement for pin 44. In the intermediate position, cooperating tapered surfaces 56 and 66 have partially contacted each other over a portion of their length.

When driving member 32 has advanced plunger 26 to its upwardmost position against plug, with end 90 of pin 44 also contacting plug, mechanism 16 is in its locked position as shown in FIG. 4. Balls 92 are resting in groove 60 in collet 42 and against surface 98 on plunger 26, while ring 82 is expanded in groove 80 and partially within groove 84, retaining plunger 26 from dropping out. The balls are cammed radially outwardly into groove 60 by the lower surface of groove 94 as plunger 26 moves upwardly. Dowels 76 are in the upwardmost portion of slot 58, and tapered surfaces 56 and 66 are in full contact. Once the store has been assembled onto mechanisms 16, the lifting apparatus is removed and the store is allowed to drop until it depends from the mechanisms. As shown in FIG. 4, tapered surface 38 on bushing 28 rests on tapered surfaces 50 on fingers 46 of the collet, which fingers are maintained in their radially outward position by tapered surface 66 on pin 44. In this position, there is an approximate ¼ inch gap between the store and the launcher mechanism. The store is, however, positively retained by mechanisms 16 and cannot be released unless plunger 26 is moved axially downward.

In order to release the store, piston 22 is actuated within the launcher mechanism, forcing plunger 26 downwardly until shoulder 68 on pin 44 clears the bottom surfaces 57 of fingers 46, which are then free to deflect inwardly toward shank portion surface 74, allowing the store to clear protuberance 48 and drop off by its own weight. It is once again pointed out that as the store begins to drop free, launcher mechanism 14 would normally impart a thrust to the store to insure that it clears the aircraft and attains the correct attitude, velocity, etc., as required for controlled flight. However, the launcher mechanism forms no part of the present invention. The restraining forces which must be overcome in moving plunger 26 downwardly include the force necessary to compress ring 82 into groove 84 and the friction force presented by surface 98 on the total number of balls 92 utilized, which are wedged against surface 98. The stored force of compression spring 86 acts through pin 44 to help move the plunger downwardly against the restraining forces. The angle of taper of surfaces 56 on fingers 46 also affects the magnitude of the restraining forces due to a varying axial component of the weight of the store being transmitted to the balls for different angles of taper. For example, if surface 56 has a 3° angle of taper from the longitudinal axis, as illustrated in FIG. 6, and assuming the store weighs 1000 pounds at 40 g's acceleration and four balls are used, a typical force required on plunger 26 to release the mechanism would be approximately 143 pounds. Under the same assumed conditions as above, but with a 1° angle of taper, the force would be approximately 83 pounds. However, if surface 56 were completely axial (i.e. 0° taper), the force necessary to release the mechanism would be quite large because surfaces 56 and 66 would not separate when plunger 26 moves, and would continue to remain in contact with each other resulting in large normal forces due to the weight of the store and thus large frictional forces which would have to be overcome. Consequently, the tapered arrangement of complementary surfaces 56 and 66 is preferred.

Having thus described a preferred embodiment of the present invention, some of its many advantages should now be readily apparent. The retention and release mechanism is relatively small, low in weight, simple to operate, reliable and substantially reusable. The only component which is discarded is the bushing attached to the store. Once the mechanism is in a locked position, release can only be effected by applying an external force to the plunger. The mechanism cannot be actuated to the locked position by a misaligned store. Actuation by tampering can only be accomplished if two things are done in sequence. First, pin 44 must be moved to an axial position wherein grooves 60 and 94 are aligned, and thereafter an axial force must be exerted on plunger 26 to lock the mechanism. These features make the present retention and release mechanism attractive as a possible universal device for suspending various types of objects from aircraft.

While in the foregoing there have been described several preferred embodiments of the invention, it should be understood that various changes and modifications can be made without departing from the true spirit and scope of the invention as recited in the appended claims.

I claim:

1. A mechanism for selectively retaining and releasing an object, comprising:

plunger means having a first and a second end and including first and second recess means;

elastic means adapted to be carried in said plunger means first recess means;

tubular pin means surrounding said plunger means in slideable relationship therewith, including first recess means in the inside surface thereof being selectively registrable with said elastic means and said plunger means first recess means, a bearing surface adjacent a first end thereof, an opening therethrough adjacent a second end thereof, a shank portion between said bearing surface and said opening, said shank portion forming a recess with respect to said bearing surface;

collet means surrounding said pin means including a deflectable portion having a protuberance thereon adjacent a first end of said collet means, said protuberance having a first bearing surface formed to cooperate with said pin means bearing surface, and a second bearing surface, said collet means further including recess means therein spaced from a second end thereof;

wedging means carried in said pin means opening and selectively registering with said plunger means second recess means and said collet means recess means;

retaining means operative to slideably retain said pin means to said collet means in a first released position of the mechanism;

biasing means operative to urge said pin means to the first released position relative to said collet means; and bushing means formed to be attached to the object including driving means for exerting an axial force on said collet means deflectable portion toward said pin means shank portion when the object is initially engaged, and means thereon adapted to cooperate with said second bearing surface on said collet means protuberance to retain the object in a second retained position of the mechanism wherein said wedging means registers with said collet means recess means and a surface of said plunger means, and said elastic means registers with said pin means first recess means to fix said pin means, said collet means and said plunger means with respect to each other, and said pin means bearing surface contacts said first bearing surface on said collet means protuberance, said means on said bushing means for retaining the object also being operative to deflect the collet means deflectable portion toward said pin means shank portion in the first released position wherein said plunger means is shifted to a position allowing said wedging means to register with said plunger means second recess means and a surface of said collet means, and causing said pin means bearing surface and said first bearing surface on said collet means protuberance to separate from each other.

2. A mechanism in accordance with claim 1 wherein said collet means deflectable portion includes at least one axial slot formed therein extending from said first end thereof to a point spaced from said second end thereof.

3. Mechanism in accordance with claim 1 wherein said collet means deflectable portion includes a plurality of axial slots formed therein, each slot extending from said first end thereof to a point spaced from said second end thereof forming a plurality of deflectable fingers.

4. A mechanism in accordance with claim 1 wherein said tubular pin means includes a plurality of openings therethrough each carrying wedging means.

5. A mechanism in accordance with claim 1 wherein said pin means includes second recess means adjacent said first recess means adapted to register with said elastic means in the second released position.

6. A mechanism in accordance with claim 1 wherein said retaining means is operative to slideably retain said pin means to said collet means between the first released position and the second retained position of the mechanism.

7. A mechanism in accordance with claim 1 wherein said pin means bearing surface and said second bearing surface on said collet means protuberance are each tapered with respect to the longitudinal axis of the mechanism.

8. A mechanism in accordance with claim 7 wherein said pin means bearing surface is tapered at an angle of approximately 1° or greater with respect to the longitudinal axis of the mechanism.

9. A joint assembly formed to be attached to a structure comprising:
a member; and
a mechanism operatively attached to said structure for selectively retaining said member thereto and releasing said member therefrom including;
plunger means having a first and a second end and including first and second recess means;
elastic means adapted to be carried in said plunger means first recess means;
tubular pin means surrounding said plunger means in slideable relationship therewith, including first recess means in the inside surface thereof being selectively registrable with said elastic means and said plunger means first recess means, a bearing surface adjacent a first end thereof, an opening therethrough adjacent a second end thereof, a shank portion between said bearing surface and said opening, said shank portion forming a recess with respect to said bearing surface;
collet means surrounding said pin means including a deflectable portion having a protuberance thereon adjacent a first end of said collet means, said protuberance having a first bearing surface formed to cooperate with said pin means bearing surface, and a second bearing surface, said collet means further including recess means therein spaced from a second end thereof;
wedging means carried in said pin means opening and selectively registering with said plunger means second recess means and said collet means recess means;
retaining means operative to slideably retain said pin means to said collet means in a first released position of the mechanism;
biasing means operative to urge said pin means to the first released position relative to said collet means;
said member including driving means for exerting an axial force on said plunger means first end, means fo camming said collet means deflectable portion toward said pin means shank portion when said member is initially engaged, and means thereon adapted to cooperate with said second bearing surface on said collet means protuberance to retain said member in a second retained position of the mechanism wherein said wedging means registers with said collet means recess means and a surface of said plunger means, and said elastic means registers with said pin means first recess means to fix said pin means, said collet means and said plunger means with respect to each other, and said pin means bearing surface contacts said first bearing surface on said collet means protuberance, said means on said bushing means for retaining said member also being operative to deflect the collet means deflectable portion toward said pin means shank portion in the first released position wherein said plunger means is shifted to a position allowing said wedging means to register with said plunger means second recess means and a surface of said collet means, and causing said pin means bearing surface and said first bearing surface on said collet means protuberance to separate from eath other.

10. A joint assembly in accordance with claim 9 wherein said collet means deflectable portion includes at least one axial slot formed therein extending from said first end thereof to a point spaced from said second end thereof.

11. A joint assembly in accordance with claim 9 wherein said collet means deflectable portion includes a plurality of axial slots formed therein, each slot extending from said first end thereof to a point spaced from said second end thereof forming a plurality of deflectable fingers.

12. A joint assembly in accordance with claim 9 wherein said tubular pin means includes a plurality of openings therethrough each carrying wedging means.

13. A joint assembly in accordance with claim 9 wherein said pin means includes second recess means adjacent said first recess means adapted to register with said elastic means in the second released position.

14. A joint assembly in accordance with claim 9 wherein said retaining means is operative to slideably retain said pin means to said collet means between the first released position and the second retained position of the mechanism.

15. A joint assembly in accordance with claim 9 wherein said pin means bearing surface and said second bearing surface on said collet means protuberance are each tapered with respect to the longitudinal axis of the mechanism.

16. A joint assembly in accordance with claim 15 wherein said pin means bearing surface is tapered at an angle of approximately 1° or greater with respect to the longitudinal axis of the mechanism.

* * * * *